June 6, 1967  H. CANCRINUS ET AL  3,323,390
FLUID TORQUE TRANSMITTER

Filed Dec. 2, 1963　　　　　　　　　　　　4 Sheets-Sheet 1

Hendrik Cancrinus and
Eric Helmuth Friedmann
INVENTORS

BY Wenderoth,
Lind and Ponack, ATTORNEYS

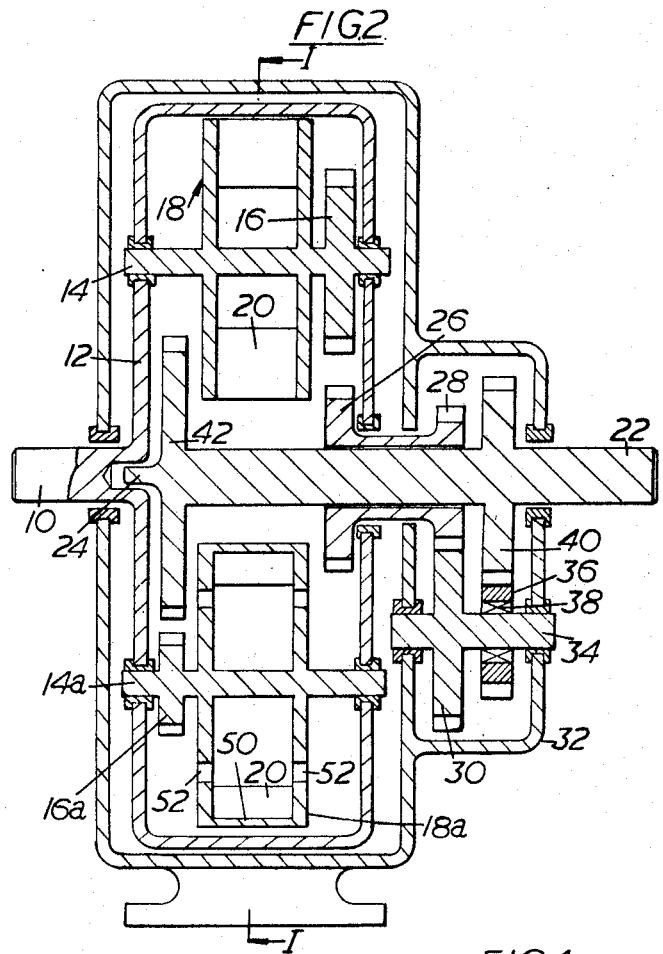
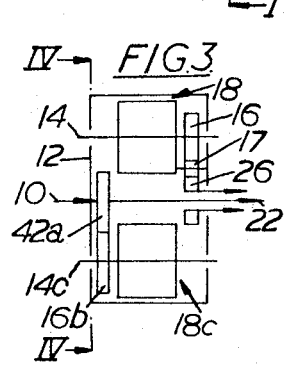
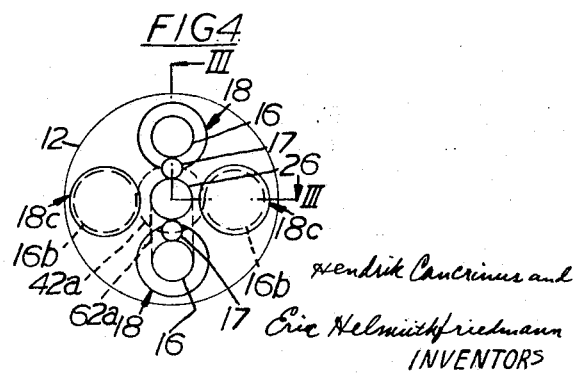

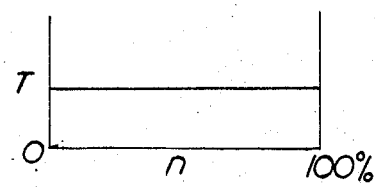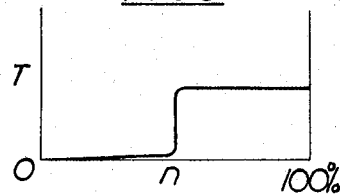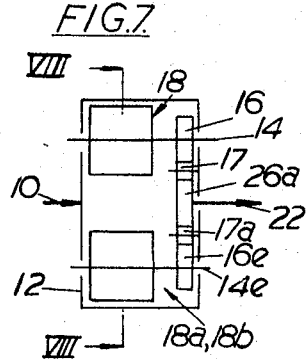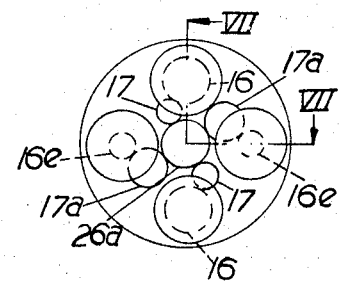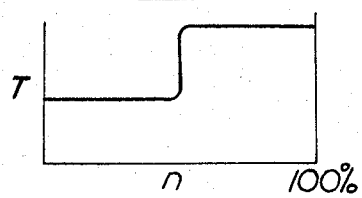

June 6, 1967 H. CANCRINUS ET AL 3,323,390
FLUID TORQUE TRANSMITTER
Filed Dec. 2, 1963 4 Sheets-Sheet 4
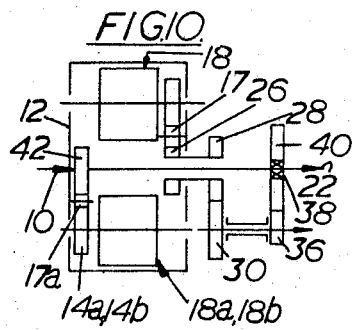
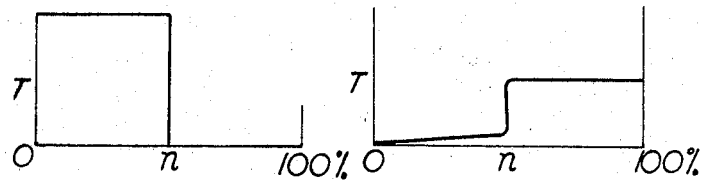
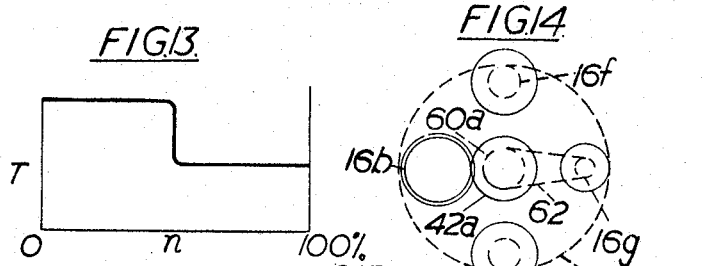
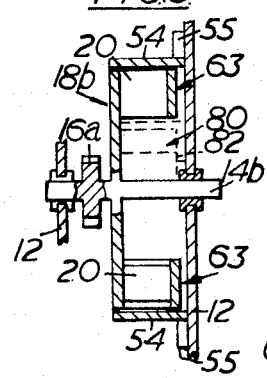
Hendrik Cancrinus and
Eric Helmuth Friedmann
INVENTORS
BY Wendroth,
Lind and Ponack ATTORNEYS United States Patent Office 3,323,390
Patented June 6, 1967

3,323,390
FLUID TORQUE TRANSMITTER
Hendrik Cancrinus and Eric Helmüth Friedmann, Cape Town, Cape Province, Republic of South Africa, assignors to Inpower Works (Proprietary) Limited, Cape Town, Cape Province, Republic of South Africa
Filed Dec. 2, 1963, Ser. No. 327,430
Claims priority, application Republic of South Africa, Dec. 11, 1962, 62/5,204
7 Claims. (Cl. 74—752)

This invention relates to a fluid torque transmitter for the transmission of rotary power by inertia, and in particular to an automatic torque transmitter adapted to provide flexibility in drive from start-up of a load until the output speed is the same as the input speed.

According to the invention, a torque transmitter comprises a carrier having an axis of rotation; a drum having an inner peripheral surface adapted to contain a quantity of liquid maintained in a peripheral layer under the influence of centrifugal force, the drum being positioned about the carrier and co-axial with the carrier, the carrier and drum being mounted to rotate about the carrier axis; drive connecting means connected to the carrier for connecting it to a source of rotary power; a first driven wheel co-axial with the carrier axis and rotatably mounted relative to the carrier; a second driven wheel co-axial with the first driven wheel and rotatably mounted relative to the carrier; connecting means connected to the first driven wheel and the second driven wheel for connection to a load to absorb rotary power; a first and second set of torque developing means mounted on the carrier within the drum and each comprising a plurality of planet wheels mounted on the carrier and adapted to rotate about their own axes, the planet wheels of the first set of torque developing means being drivingly connected to the first driven wheel and the planet wheels of the second set of torque developing means being drivingly connected to the second driven wheel, each of the planet wheels having a plurality of liquid entrapping means fast therewith and adapted to pass through the peripheral liquid layer, the liquid entrapping means having openings for receiving liquid therein entrapped from the peripheral liquid layer and being adapted to displace the entrapped liquid inwardly away from the peripheral liquid layer in a direction towards the carrier axis when the planet wheels rotate relative to the carrier, and the openings of the liquid entrapping means being so positioned as to facilitate after displacement rejection of such displaced liquid under the influence of centrifugal force in a direction outwardly towards the peripheral liquid layer, and the second set of torque developing means being provided with liquid retaining means disposed between the liquid-entrapping means and the central region of the carrier, for preventing liquid from being rejected away from the planet wheel axis towards the central region of the carrier when the planet wheels of the second set of torque-developing means are rotating about their axes relative to the carrier.

The liquid entrapping means of the planet wheels of the second set of torque developing means may be in the form of substantially C-section buckets in which their form of openings are defined by radially spaced inner and outer lips, the inner lips of adjacent buckets being spaced apart circumferentially and in which there is provided an internal arcuate shroud fast with the carrier and extending arcuately between the inner lips of at least those buckets having their openings directed outwardly away from the carrier axis.

Alternatively the liquid retaining means may be in the form of an arcuate shroud extending around part of the periphery of the liquid entrapping means of the second set of torque developing means and at least within the region defined by the locus of the axis of the planet wheel when it orbits about the carrier during rotation of the carrier about its axis.

The ends of the arcuate shroud may extend into the layer of liquid.

According to a further embodiment of the invention, the liquid entrapping means of the second set of torque developing means may be in the form of substantially C-section buckets having their openings defined by radially spaced inner and outer lips and arranged in one direction about the planet wheel axes, the liquid retaining means being provided in the form of a peripheral wall fast with the buckets and covering the spaces between the outer lips of the buckets of the second set of torque developing means, the buckets being mounted between a pair of axially spaced side plates, and in which axially directed circumferentially spaced openings may be provided in at least one of the side plates at a radial spacing from the planet wheel axis which is substantially the same as that of the inner lips of the buckets.

The planet wheels of the first set of torque developing means may be drivingly connected to the first driven wheel by means of a toothed idler mounted to rotate on the carrier and meshing simultaneously with the first driven wheel and the planet wheels of the first set of torque developing means.

The planet wheels of the first set of torque developing means and the first driven wheel may be in the form of sprockets, drivingly connected by means of a chain meshing with those sprockets.

The second driven wheel may be a toothed internal gear, and the planet wheel of the second set of torque developing means may be in the form of toothed gear wheels being in direct meshing contact with the second driven wheel.

The first and second driven wheels may be fast with each other.

There may be provided an output shaft connected to the second driven wheel, a gear train, and a free wheel device between the first driven wheel and the output shaft.

The invention will now be described with reference to the accompanying drawings, to illustrate the invention by way of example.

In the drawings:

FIGURE 2 shows an axial section at II—II in FIGURE 1, also showing different types of liquid-entrapping means which may be used;

FIGURE 3 shows diagrammatically an axial section at III—III in FIGURE 4;

FIGURE 4 shows diagrammatically a sectional end elevation at IV—IV in FIGURE 3;

FIGURE 5 shows diagrammatically a graphical representation of torque generated by one type of liquid-entrapping means against percentage speed of output shaft relative to input shaft;

FIGURE 6 shows diagrammatically a graphical representation of torque generated by another type of liquid-entrapping means, against percentage output shaft speed relative to input shaft speed;

FIGURE 7 shows diagrammatically an axial section at VII—VII in FIGURE 8, of another arrangement in which a single driven wheel is provided for performing the function of a first and second driven wheels;

FIGURE 8 shows diagrammatically a sectional end elevation at VIII—VIII in FIGURE 7;

FIGURE 9 shows diagrammatically a torque characteristic of generated torque against percentage speed of output shaft relative to input shaft for the embodiment shown in FIGURES 7 and 8;

FIGURE 10 shows diagrammatically an axial section of a machine similar to that shown in FIGURES 1 and 2;

FIGURE 11 shows diagrammatically a torque characteristic of generated torque against percentage speed of output shaft relative to input shaft, for a set of first liquid-entrapping means;

FIGURE 12 shows diagrammatically a torque characterized of generated torque against percentage speed of output shaft relative to input shaft for a second set of liquid-entrapping means;

FIGURE 13 shows a composite torque output speed curve characteristic of the apparatus when taken as a whole;

FIGURE 14 shows diagrammatically an axial section to show the various types of driving connections between the planet wheels and the second driven wheel which can be used; and FIGURE 15 shows a detail axial section at XV—XV in FIGURE 1.

Figure 1:
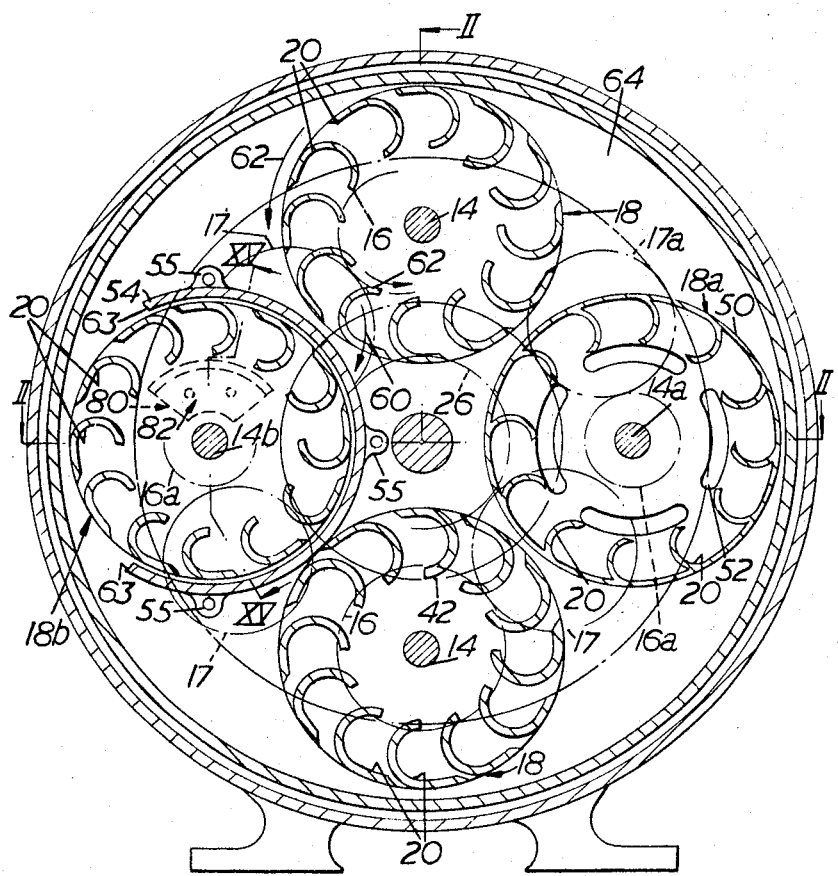
FIGURE 1 shows a transverse sectional end elevation at I—I in FIGURE 2, and showing different types of liquid-entrapping means which can be used in the machine.

In FIGURES 1 and 2 of the drawings, different types of liquid-entrapping means are shown, but this is merely to conserve space, and to avoid showing further drawings, similar in principle but merely differing in the types of liquid-entrapping means used. In the drawings, reference numeral 10 refers to an input shaft mounted to rotate about its axis, and having means for connection to a source of rotary power, and being integral with a carrier 12 carrying a first set of torque developing means including planet wheel shafts 14 rotatably about their axes, and having their axes parallel to the input shaft axis. Planet wheels 16 are fast with the shafts 14, and have fast with them liquid-entrapping means in the form of liquid-entrapping wheels 18 having curved vanes 20, or buckets of substantially C-section, as shown in FIGURE 1 of the drawings.

Co-axial with the input shaft, there is provided an output shaft 22 having means for connection to a load to absorb rotary power. The output shaft has a stub 24 carried rotatably and co-axially in a bearing in a socket provided in the inner end of input shaft 10. A first driven wheel in the form of a sun wheel 26 is provided, which is in driving connection with planet wheels 16 via idlers 17. The sun wheel is mounted to rotate about the axis of output shaft 22, and has fast with it a toothed gear wheel 28, meshing with a further toothed gear wheel 30 mounted to rotate about its axis in a casing or framework 32. The toothed gear wheel 30 has fast with it a shaft 34 on which is mounted a further gear wheel 36 mounted on a free wheel device 38, and engaging with a toothed gear wheel 40 fast with output shaft 22. The pitch diameter of sun wheel 26 is the same as that of the planet wheels 16.

A second driven wheel in the form of a sun wheel 42, which is in driving connection with a second set of torque developing means including planet wheels 16a via idler wheels 17a, is fast and co-axial with the output shaft 22. Fast with planet wheel 16a is provided a liquid-entrapping means in the form of liquid-entrapping wheel 18a having liquid retaining means in the form of a circumferential or peripheral wall 50, and side openings 52, whereby liquid may enter or leave the liquid-entrapping wheel 18a. This peripheral wall 50 is fast with the curved vanes 20. The wall 50 acts as retaining means to prevent liquid from leaving on the outside of the bucket wheel.

An alternative wheel 18b is shown opposite wheel 18a, the wheel 18b being substantially the same as wheel 18, but having liquid-retainer means comprising an arcuate shroud 54 extending part of the way around it, along its periphery, nearer the carrier axis, and at least within the region defined by the locus of the axis of the planet wheel when it orbits about the carrier axis, and preferably having its ends 63 submerged in the liquid layer 64. The shroud 54 is fast with the carrier 12 via lugs 55 and serves as retaining means to retain liquid within the liquid-entrapping wheel 18b, while it is rotating relatively fast about its own axis during the start-up period of the machine, and while the output shaft 22 is still rotating relatively slowly.

In use, when the input shaft is rotated in clockwise fashion, when seen in FIGURE 1, and when the output shaft 22 has a lower speed than the input shaft, the idler wheel 17, which meshes with the sun wheel 26, will rotate about its axis in the direction of arrow 60. This rotation of the idler wheel 17 will cause planet wheel 16 and the liquid-entrapping wheel 18 fast with it, to rotate relative to the carrier in the direction of arrow 62 about the axis of axle 14. In so doing, the vanes 20 will pass through the liquid peripheral layer 64, and thus will entrap liquid from the peripheral layer on its trailing side relative to the direction of rotation of the carrier, and will carry it towards the direction of the carrier axis. This liquid will be brought towards the carrier axis, will be subjected to centrifugal force, and will be rejected outwardly from the central region of the carrier. This results in an unbalanced mass being on the trailing side of the planet wheel and a moment will be generated by the mass of the liquid in the vanes 20, about the axis of axle 14. This moment will be transmitted via the teeth of planet wheels 16, idlers 17, onto the teeth of sun wheel 26, and will thus become available as an output torque on shaft 22, via toothed gear wheels 40, 36, 30, and 28.

The moment generated about the axis of axle 14 is thus converted via the gearing mentioned, and is thus available as a converted torque on the output shaft 22. In this embodiment of the invention, the planet wheels 16 have pitch diameters substantially equal to that of sun wheel 26, the two liquid-entrapping wheels 18 being mounted in dynamic balance, and acting as a pair.

Referring now to the operation of the wheels 18a (or 18b) during the start-up period, liquid will be received into wheel(s) 18a (or 18b), but will be rotating so fast about its own axis that the liquid received into it will be flung outwardly away from the planet wheel axis to form an annular layer within the retaining means 50 (or 54) of wheel(s) 18a (or 18b). Thus no unbalance about the planet wheel axis can arise, which can lead to the generation of a moment about the planet wheel axis at this stage.

But as soon as the speed of the output shaft has increased sufficiently, relative to the carrier speed, then the speed of these liquid-entrapping wheels 18a (or 18b) relative to the carrier, will become less, and hence the tendency of the liquid in these liquid-entrapping wheels to be flung outwardly away from the planet wheel axes, will become less and less and accordingly the fluid will tend to flow over the inner lips of the vanes 20, in a direction away from the carrier axis. When this takes place, liquid will be retained in the vanes which are open towards the second axis, and there will be little or no liquid in the vanes which are open away from the second axis. At this time then, centrifugal force acting on this unbalanced mass of the liquid within the vanes, will cause a moment about the planet wheel axes which is transmitted to the output shaft via sun wheel 42, in a manner similar to that described previously.

As the output shaft speeds up, so the rate of rotation of the wheel(s) 18a (or 18b) relative to the carrier decreases until finally when the velocity ratio between input shaft and first sun wheel is unity, the wheel(s) 18a (or 18b) are stationary relative to the carrier, and are merely carried orbitally around by the carrier about the second axis, the moment exerted by centrifugal force on the mass of liquid within the vanes being sufficient to counter-balance the load torque on the output shaft.

The starting-up of the device and running up to full speed involves two phases, namely a first phase, in which the first sun wheel 26 and co-operating planet wheels 18 generate torque, i.e. those planet and sun wheels having a diameter ratio of the order of unity, and a second phase in which torque is generated by the planet wheels 18a (or 18b) and transmitted over sun wheel 42.

Referring now to FIGURES 3 and 4 of the drawings, the parts corresponding to those shown in FIGURES 1 and 2 of the drawings, bear similar numbers. However, it will be noted that planet wheel 16b meshes directly with sun wheel 42a, both being toothed gear wheels. This direct meshing makes it necessary for the liquid-entrapping wheel 18c to have its buckets 20 disposed in a direction opposite to those shown in FIGURE 1 for wheel 18a (or 18b). In other words, the openings of the buckets 20, instead of being arranged in a clockwise direction about the planet wheel axis, when viewed in the direction of FIGURE 1, will have their openings directed in an anti-clockwise direction. This will result in liquid being entrapped on the leading side of the wheels 18c, relative to the direction of rotation of the carrier, and not on the trailing side as with wheels 18a (or 18b).

Instead of providing an idler wheel 17, the driven wheel 26 may be a toothed sprocket, and the planet wheel 16 may also be a toothed sprocket having a pitch diameter the same as the driven sprocket 26, the sprockets being drivingly associated via chain 62a.

The torque speed characteristic shown in FIGURE 5, is the torque obtainable from the set of bucket wheels 18, and the torque speed characteristic shown in FIGURE 6, is the torque obtainable from the bucket wheels 18a, 18b or 18c, the composite torque speed characteristic being shown in FIGURE 9.

Referring now to FIGURES 7 and 8 of the drawings, the arrangement is somewhat similar to the arrangement previously described, except that the sun wheels 26 and 42 are now embodied in a single driven wheel 26a which serves a dual purpose, namely, to carry over torque generated about the axis 14e by the bucket wheels 18a (or 18b). In this arrangement, however, the planet wheels 16 must have a pitch diameter of the same order as the sun wheel 26a, and preferably have the same pitch diameter. The pitch diameter of the planet wheel 16e must, however, be smaller than that of the sun wheel 26a, and is preferably substantially smaller.

The torque speed characteristics of the two sets of bucket wheels 18 on the one hand, and 18a (or 18b) on the other hand, are similar to those shown in FIGURES 5 and 6. Accordingly, the composite torque speed characteristic is also substantially as shown in FIGURE 9 of the drawings.

Referring now to FIGURE 10 of the drawings, there is shown diagrammatically, a view corresponding to FIGURE 2. FIGURE 11 shows the torque speed characteristic of the bucket wheels 18, and FIGURE 12 shows the torque speed characteristic of the bucket wheels 18a (or 18b). The composite torque speed characteristic of the two sets of bucket wheels, is represented as shown in FIGURE 13. By a suitable choice of bucket wheels and bucket sizes, the magnitude of the starting torque can be determined at any intermediate value, smaller than, equal to, or greater than the full load torque. A free wheel device 38 is incorporated to prevent overrunning of bucket wheel 18.

FIGURE 14 shows various driving connections between the planet wheels and the second driven wheel. In one case the second driven wheel is in the form of an internal gear 60 with which toothed planet gear wheels 16f are in mesh. An alternative arrangement is shown in which the driven wheel is in the form of a toothed sprocket 60a, and planet wheel 16g is also a toothed sprocket having a pitch diameter smaller than the sun sprocket 60a, and being associated with each other via chain 62. A further alternative is shown in which the toothed planet wheel 16b meshes directly with the toothed driven wheel 42a (see also FIGURE 3).

Referring to FIGURES 1 and 15, an internal shroud 80 may be provided as liquid retaining means in addition to arcuate shroud 54 to assist in further retaining liquid in the liquid-entrapping wheel 18b. The shroud 80 is attached to the carrier 12 via flange 82. Its function is to retain liquid in the wheel 18b during the time when the speed of rotation of the wheel 18b relative to the carrier, is approaching zero.

In practice, a machine will have sets of two or more wheels of 18 and of 18a (or 18b). A machine may also have a multiple of sets (more than two) of wheels with a multiple of co-operating driven wheels, to provide a multiple stepped torque speed characteristic.

An advantage of a torque convertor in accordance with this invention is that a high-starting torque can be available, via the gearing shown in the drawings, and then an automatic torque change-over takes place as soon as the speed of the output shaft has increased or decreased sufficiently. After the velocity ratio between input shaft 10 and sun wheel 26 has reached unity, then the wheels 18 will tend to reverse their direction of rotation about their axes. A free wheel device 38 is provided to prevent reverse rotation of these wheels relative to their original direction of rotation during the first phase of the start-up period. The free wheel device 38 prevents these wheels from being driven by the second set of torque developing means via the output shaft. Thereby the power loss created by such reverse operation is eliminated.

We claim:
1. A torque transmitter which comprises
a carrier having an axis of rotation;
a drum having an inner peripheral surface adapted to contain a quantity of liquid maintained in a peripheral layer under the influence of centrifugal force, the drum being positioned about the carrier and co-axial with the carrier, the carrier and drum being mounted to rotate about the carrier axis;
drive connecting means connected to the carrier for connecting it to a source of rotary power;
a first driven wheel co-axial with the carrier axis and rotatably mounted relative to the carrier;
a second driven wheel co-axial with the first driven wheel and rotatably mounted relative to the carrier;
connecting means connected to the first driven wheel and the second driven wheel for connection to a load to absorb rotary power;
a first and second set of torque developing means mounted on the carrier within the drum and each comprising a plurality of planet wheels mounted on the carrier and adapted to rotate about their own axes, the planet wheels of the first set of torque developing means being drivingly connected to the first driven wheel and the planet wheels of the second set of torque developing means being drivingly connected to the second driven wheel, each of the planet wheels having a plurality of liquid entrapping means fast therewith and adapted to pass through the peripheral liquid layer, the liquid entrapping means having openings for receiving liquid therein entrapped from the peripheral liquid layer and being adapted to displace the entrapped liquid inwardly away from the peripheral liquid layer in a direction towards the carrier axis when the planet wheels rotate relative to the carrier, and the openings of the liquid entrapping means being so positioned as to facilitate after displacement rejection of such displaced liquid under the influence of centrifugal force in a direction outwardly towards the peripheral liquid layer, and only the second set of torque developing means being provided with liquid retaining means disposed between the liquid-entrapping means and the central region of the carrier for preventing liquid from being rejected away from the planet wheel axis towards the central region of the carrier when the planet wheels of the second set of torque-developing means are rotating about their axes relative to the carrier, said liquid retaining means being open in a direction away from the central region of the carrier.

2. A torque transmitter as claimed in claim 1 in which the liquid entrapping means of the planet wheels of the second set of torque developing means are in the form of substantially C-section buckets in which their openings are defined by radially spaced inner and outer lips, the inner lips of adjacent buckets being spaced apart circumferentially and in which there is provided an internal arcuate shroud fast with the carrier and extending arcuately between the inner lips of at least those buckets having their openings directed outwardly away from the central region of the carrier.

3. A torque transmitter as claimed in claim 1 in which the liquid retaining means is in the form of an arcuate shroud extending around part of the periphery of the liquid entrapping means of the second set of torque developing means and at least within the region defined by the locus of the axis of the planet wheel when it orbits about the carrier during rotation of the carrier about its axis.

4. A torque transmitter as claimed in claim 3 in which the ends of the arcuate shroud extend into the layer of liquid.

5. A torque transmitter which comprises
a carrier having an axis of rotation;
a drum having an inner peripheral surface adapted to contain a quantity of liquid maintained in a peripheral layer under the influence of centrifugal force, the drum being positioned about the carrier and co-axial with the carrier, the carrier and drum being mounted to rotate about the carrier axis;
drive connecting means connected to the carrier for connecting it to a source of rotary power;
a first driven wheel co-axial with the carrier axis and rotatably mounted relative to the carrier;
a second driven wheel co-axial with the first driven wheel and rotatably mounted relative to the carrier;
connecting means connected to the first driven wheel and the second driven wheel for connection to a load to absorb rotary power;
a first and second set of torque-developing means mounted on the carrier within the drum and each comprising a plurality of planet wheels mounted on the carrier and adapted to rotate about their own axes, the planet wheels of the first set of torque-developing means being drivingly connected to the first driven wheel and the planet wheels of the second set of torque-developing means being drivingly connected to the second driven wheel, each of the planet wheels having a plurality of liquid-entrapping means fast therewith and adapted to pass through the peripheral liquid layer, the liquid-entrapping means of the first set of torque-developing means having openings for receiving liquid therein entrapped from the peripheral liquid layer and being adapted to displace the entrapped liquid inwardly away from the peripheral liquid layer in a direction towards the carrier axis when the planet wheels rotate relative to the carrier, and the openings of the liquid-entrapping means being so positioned as to facilitate after displacement rejection of such displaced liquid under the influence of centrifugal force in a direction outwardly towards the peripheral liquid layer, the planet wheels of the second set of torque-developing means further comprising a pair of axially spaced side walls and a peripheral wall fast with the side walls, said liquid-entrapping means of said second set of torque-developing means being C-shaped buckets extending between said side walls parallel to the axis of said planet wheels and having the radially outer edges thereof joined to said peripheral wall, at least one of said side walls having axially directed circumferentially spaced openings therein.

6. A torque transmitter according to claim 5, in which the C-section buckets of the second set of torque-developing means have inner lips and in which the circumferentially spaced openings in the side wall are at a radial spacing from the planet wheel axis which is substantially the same as that of the inner lips of the buckets.

7. A torque transmitter which comprises a carrier having an axis of rotation; a drum having an inner peripheral surface adapted to contain a quantity of liquid maintained in a peripheral layer under the influence of centrifugal force, the drum being positioned about the carrier and co-axial with the carrier, the carrier and drum being mounted to rotate about the carrier axis; drive connecting means connected to the carrier for connecting it to a source of rotary power; a driven wheel co-axial with the carrier axis and rotatably mounted relative to the carrier; connecting means connected to the driven wheel for connection to a load to absorb rotary power; a first and second set of torque-developing means mounted on the carrier within the drum and each comprising a plurality of planet wheels mounted on the carrier and adapted to rotate about their own axes, the planet wheels of both sets of torque-developing means being drivingly connected to the driven wheel, each of the planet wheels having a plurality of liquid-entrapping means fast therewith and adapted to pass through the peripheral liquid layer, the liquid-entrapping means having openings for receiving liquid therein entrapped from the peripheral liquid layer and being adapted to displace the entrapped liquid inwardly away from the peripheral liquid layer in a direction towards the carrier axis when the planet wheels rotate relative to the carrier, the openings of the liquid-entrapping means being so positioned as to facilitate after displacement rejection of the displaced liquid under the influence of centrifugal force in a direction outwardly towards the peripheral liquid layer, and only the second set of torque-developing means being provided with liquid retaining means disposed between the liquid-entrapping means and the central region of the carrier for preventing liquid from being rejected away from the planet wheel axis towards the central region of the carrier when the planet wheels of the second set of torque-developing means are rotating about their axes relative to the carrier, said liquid retaining means being open in a direction away from the central region of the carrier.

References Cited

UNITED STATES PATENTS

| 1,461,559 | 7/1923 | Reece et al. | 74—752 |
| 1,507,369 | 9/1924 | Escott | 74—774 |
| 1,666,152 | 4/1928 | Strigl | 74—774 |
| 1,691,612 | 11/1928 | Reece et al. | 74—752 |
| 2,079,691 | 5/1937 | Joyce | 74—752 |
| 2,293,547 | 8/1942 | Hobbs | 74—774 |
| 3,077,793 | 2/1963 | Cancrinus | 74—774 X |

DONLEY J. STOCKING, *Primary Examiner.*

THOMAS C. PERRY, DAVID J. WILLAMOWSKY,
*Examiners.*